US012621870B2

(12) United States Patent
Taherzadeh Boroujeni et al.

(10) Patent No.: US 12,621,870 B2
(45) Date of Patent: May 5, 2026

(54) DEFAULT SYSTEM INFORMATION CONFIGURATION FOR DIFFERENT NETWORK TYPES

(71) Applicant: QUALCOMM Incorporated, San Diego, CA (US)

(72) Inventors: Mahmoud Taherzadeh Boroujeni, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/446,957

(22) Filed: Aug. 9, 2023

(65) Prior Publication Data

US 2025/0056616 A1     Feb. 13, 2025

(51) Int. Cl.
*H04W 48/16*          (2009.01)
*H04W 74/0833*        (2024.01)
(Continued)

(52) U.S. Cl.
CPC ....... *H04W 74/0833* (2013.01); *H04W 48/16* (2013.01); *H04W 74/0836* (2024.01); *H04W 84/06* (2013.01)

(58) Field of Classification Search
CPC ............. H04W 74/0833; H04W 48/16; H04W 74/0836; H04W 84/06; H04W 74/006; H04W 24/02; H04W 88/16; H04W 84/18; H04W 88/10; H04W 84/042; H04W 92/045; H04W 16/18; H04W 28/0268; H04W 76/12; H04W 24/04; H04W 28/0284; H04W 76/15; H04W 88/18; H04W 92/02; H04W 88/06; H04W 88/085; H04W 16/10; H04W 40/02; H04W 92/14; H04W 88/14; H04W 16/24; H04W 28/16; H04W 76/16; H04W 48/06; H04W 36/035; H04W 36/00224; H04W 72/04; H04W 60/00; H04W 84/02; H04W 16/26; H04W 28/08; H04W 36/00698; H04W 36/0072; H04W 36/22; H04L 47/18; H04L 65/1016; H04L 12/4633; H04L 63/0272; H04L 5/0007; H04L 9/30; H04L 47/125; H04L 61/2514; H04L 49/70; H04L 61/2535; H04L 12/2832; H04L 25/03165; H04L 41/0895; H04L 41/0894; Y02D 30/70;
(Continued)

(56) References Cited

U.S. PATENT DOCUMENTS

| | | | |
|---|---|---|---|
| 2008/0182577 A1* | 7/2008 | Ng | H04W 72/535 455/435.2 |
| 2020/0350972 A1* | 11/2020 | Yi | H04B 7/088 |

(Continued)

*Primary Examiner* — Nimesh Patel
(74) *Attorney, Agent, or Firm* — Dinsmore & Shohl LLP

(57) ABSTRACT

Certain aspects of the present disclosure provide techniques for configuring default system information for different network types. An example method, performed by a user equipment (UE), may include obtaining information indicating which set of default parameters, from two or more different sets of default parameters associated with different network types, to use for performing a random access channel (RACH) procedure and performing the RACH procedure with a network entity using the indicated set of default parameters.

30 Claims, 11 Drawing Sheets

800

(51) Int. Cl.
 *H04W 74/0836* (2024.01)
 *H04W 84/06* (2009.01)

(58) Field of Classification Search
 CPC ...... H04B 7/0413; H04B 7/0617; H04B 7/14;
  H04B 17/318; H04B 7/022; H04B
  10/25753; H04B 7/024
 See application file for complete search history.

(56) References Cited

U.S. PATENT DOCUMENTS

| | | | |
|---|---|---|---|
| 2021/0298088 A1* | 9/2021 | Qi ..................... | H04W 74/0833 |
| 2023/0029663 A1* | 2/2023 | Abedini ............ | H04W 74/0841 |
| 2023/0180297 A1* | 6/2023 | Shin ................... | H04W 74/006 |
| | | | 370/329 |

* cited by examiner

600

604

602

| UE | ←—uU—→ | Network Entity |

606

PRACH/PUSCH (MSG A)

PDCCH/PDSCH (MSG B)

608

800

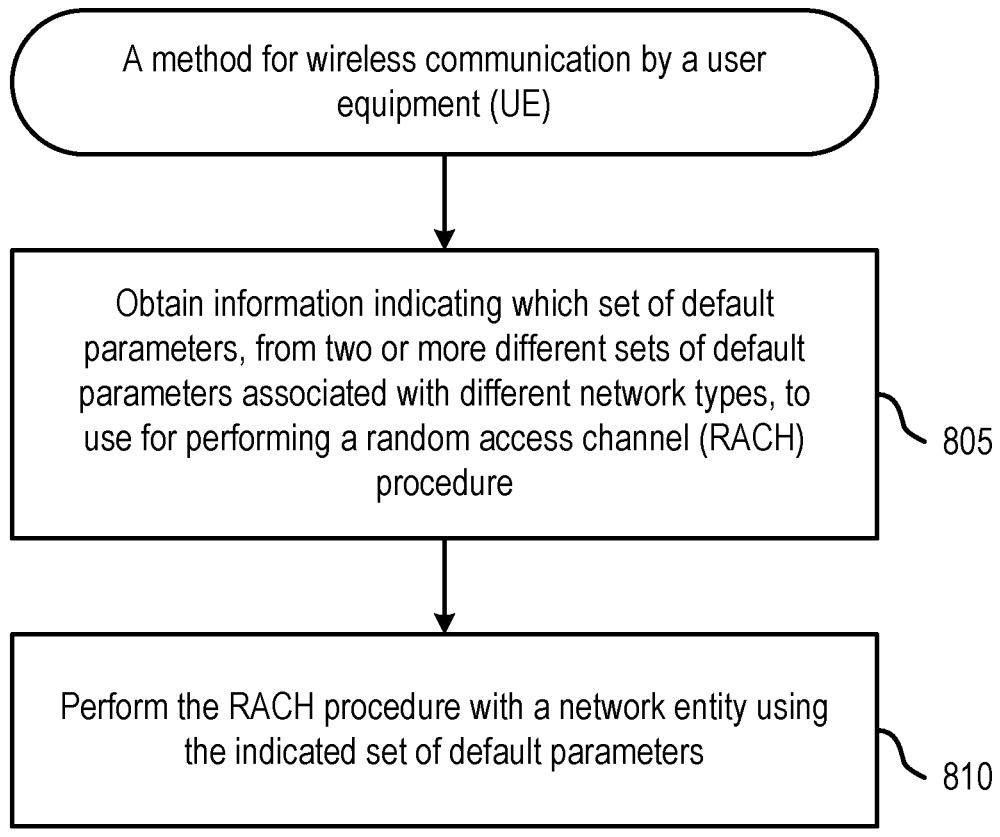

A method for wireless communication by a user
equipment (UE)

Obtain information indicating which set of default
parameters, from two or more different sets of default
parameters associated with different network types, to
use for performing a random access channel (RACH)
procedure

805

Perform the RACH procedure with a network entity using
the indicated set of default parameters

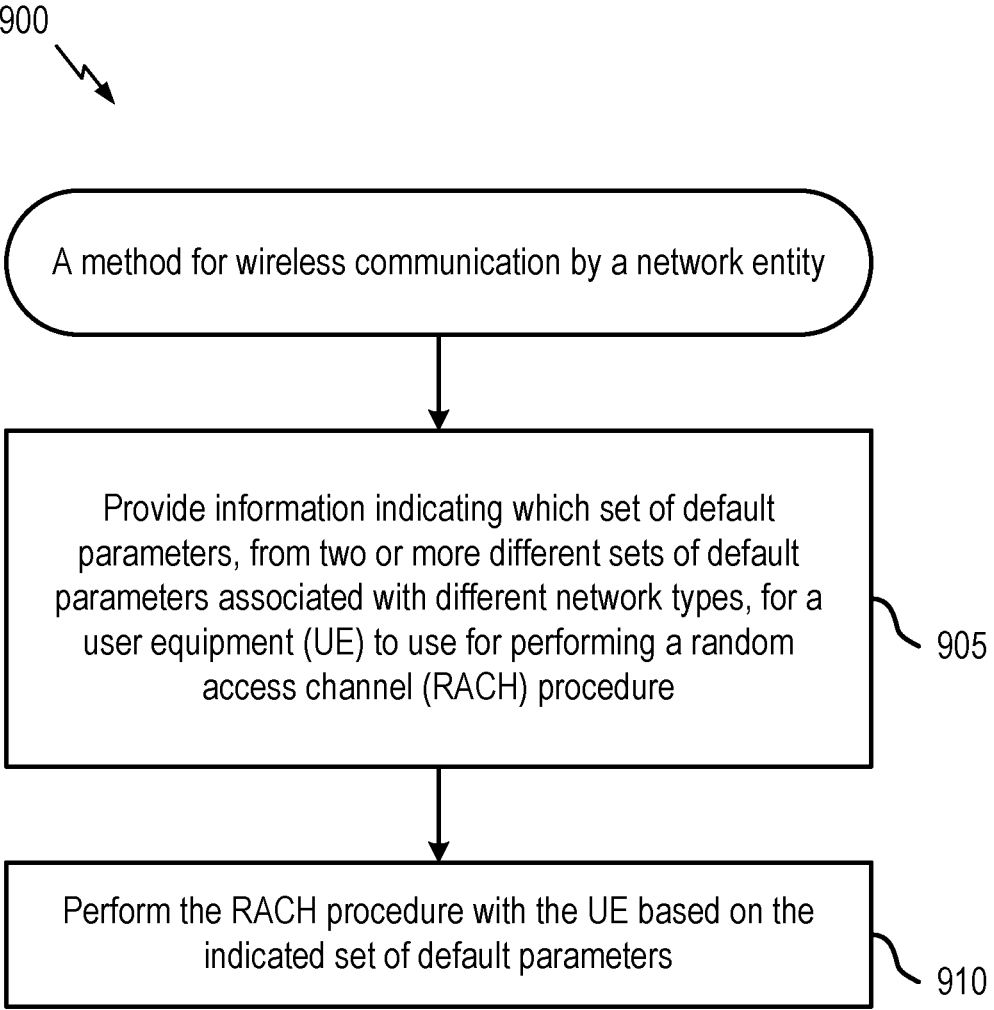

900

A method for wireless communication by a network entity

Provide information indicating which set of default parameters, from two or more different sets of default parameters associated with different network types, for a user equipment (UE) to use for performing a random access channel (RACH) procedure

905

Perform the RACH procedure with the UE based on the indicated set of default parameters

DEFAULT SYSTEM INFORMATION CONFIGURATION FOR DIFFERENT NETWORK TYPES

BACKGROUND

Field of the Disclosure

Aspects of the present disclosure relate to wireless communications, and more particularly, to techniques for configuring default system information for different network types.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes obtaining information indicating which set of default parameters, from two or more different sets of default parameters associated with different network types, to use for performing a random access channel (RACH) procedure; and performing the RACH procedure with a network entity using the indicated set of default parameters.

Another aspect provides a method for wireless communication by a network entity. The method includes providing information indicating which set of default parameters, from two or more different sets of default parameters associated with different network types, for a user equipment (UE) to use for performing a random access channel (RACH) procedure; and performing the RACH procedure with the UE based on the indicated set of default parameters.

Other aspects provide: an apparatus operable, configured, or otherwise adapted to perform any one or more of the aforementioned methods and/or those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8 depicts a method for wireless communications.

FIG. 9 depicts a method for wireless communications.

DETAILED DESCRIPTION

Figure 1:
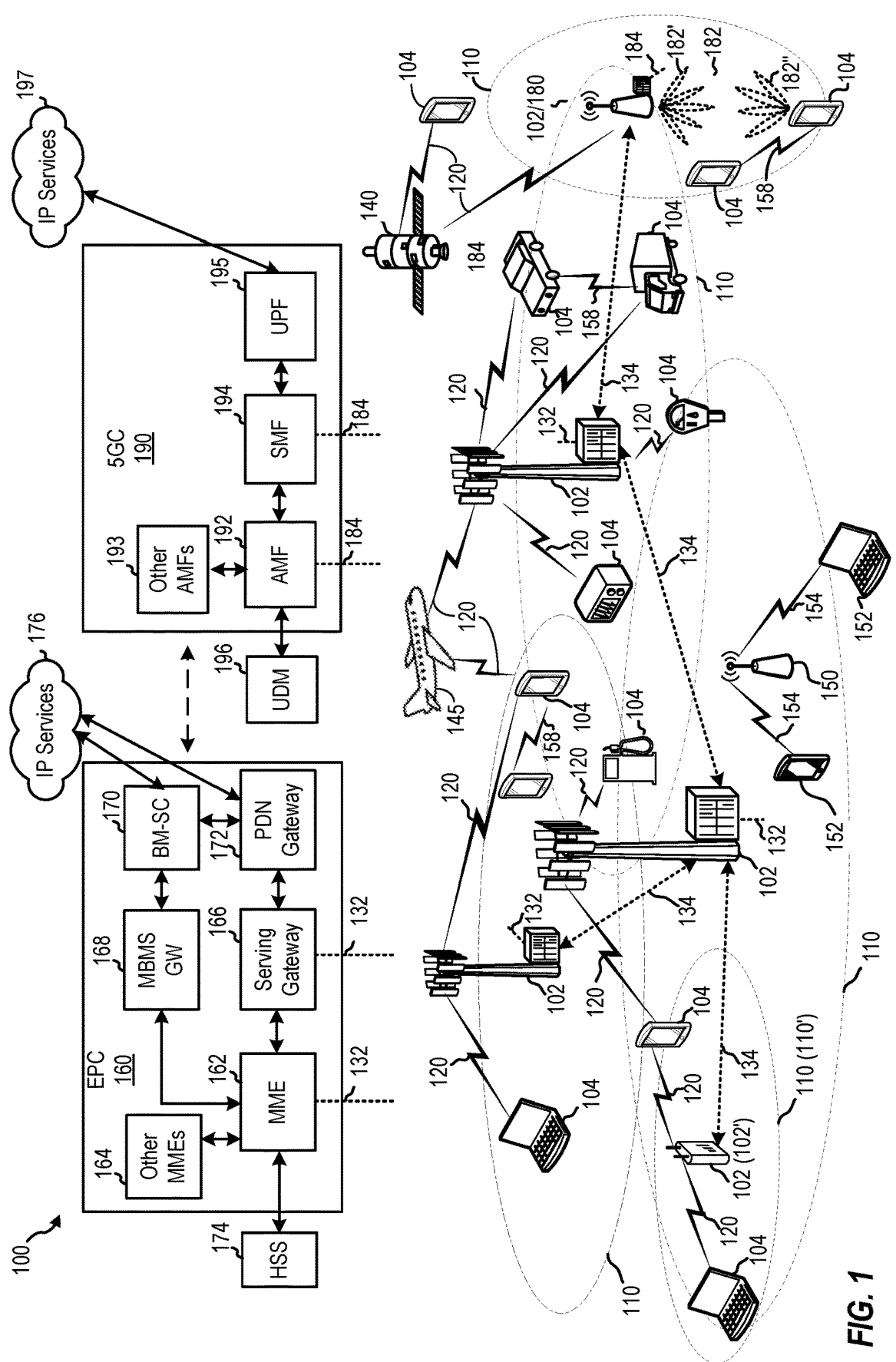
FIG. 1 depicts an example wireless communications network.

Aspects of the present disclosure provide apparatuses, methods, processing systems, and computer-readable mediums for configuring default system information for different network types.

For example, when access a network, a user equipment (UE) may perform a random access channel (RACH) procedure. The RACH procedure may begin with the UE transmitting a first message of the RACH procedure to a network entity (e.g., base station), known a physical random access channel (PRACH) message or message 1 (MSG1), which may include information such as a RACH preamble. Thereafter, the network entity may respond to the UE by transmitting a second message of the RACH procedure (MSG2), known as a random access response (RAR) message. Thereafter, the UE may transmit a third message of the RACH procedure (MSG3) to the network entity and, in response, may receive a fourth message of the RACH procedure (MSG4) from the network entity. Additional details regarding this RACH procedure are described below with respect to FIGS. 5 and 6.

In some cases, the UE may be configured to perform the RACH procedure in accordance with a set of default parameters, which may be indicated in system information received from a network entity (e.g., base station). In some cases, the set of default parameters may indicate information, such as a number times that the UE should repeat transmission of MSG1 and MSG3. Repeated transmissions of MSG1 and MSG3 by the UE may improve the probability that these transmissions are properly received and decoded by the network entity, which is crucial for success of the RACH procedure and access to the network.

In some cases, the set of default parameters included in the system information may perform well for certain network types, such as terrestrial networks (TNs) but may not perform well for other network types, such as non-terrestrial networks (NTNs). For example, in some cases, the number of repetitions of MSG1 and MSG3 in the set of default parameters for a TN may cause the network entity in an NTN to not properly receive MSG1 or MSG3, leading to failed RACH procedures and delayed access to the NTN.

As such, it would be beneficial to include one or more other sets of default parameters for other network types to improve the probability that the RACH procedure is successful. However, including these other sets of default parameters would increase a payload size of the system information, which may increase the code rate of the system information and, in turn, cause issues with proper reception of the system information in certain network types, such as NTNs.

Accordingly, aspects of the present disclosure provide techniques for configuring different sets of default parameters for different network types while reducing or minimizing an impact to the payload size of the system information transmitted by the network entity. For example, in some cases, rather than including the different sets of default parameters in the system information (which would otherwise increase the payload size of the system information), the different sets of default parameters may be preconfigured (e.g., in memory of the UE) and an indication of which set of default parameters, of the different sets of default parameters, to use for performing the RACH procedure may be provided to the UE. The UE may then obtain the indicated set of default parameters (e.g., from memory of the UE rather than from the system information from the network entity) and may perform the RACH procedure in accordance with the indicated and obtained set of default parameters.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
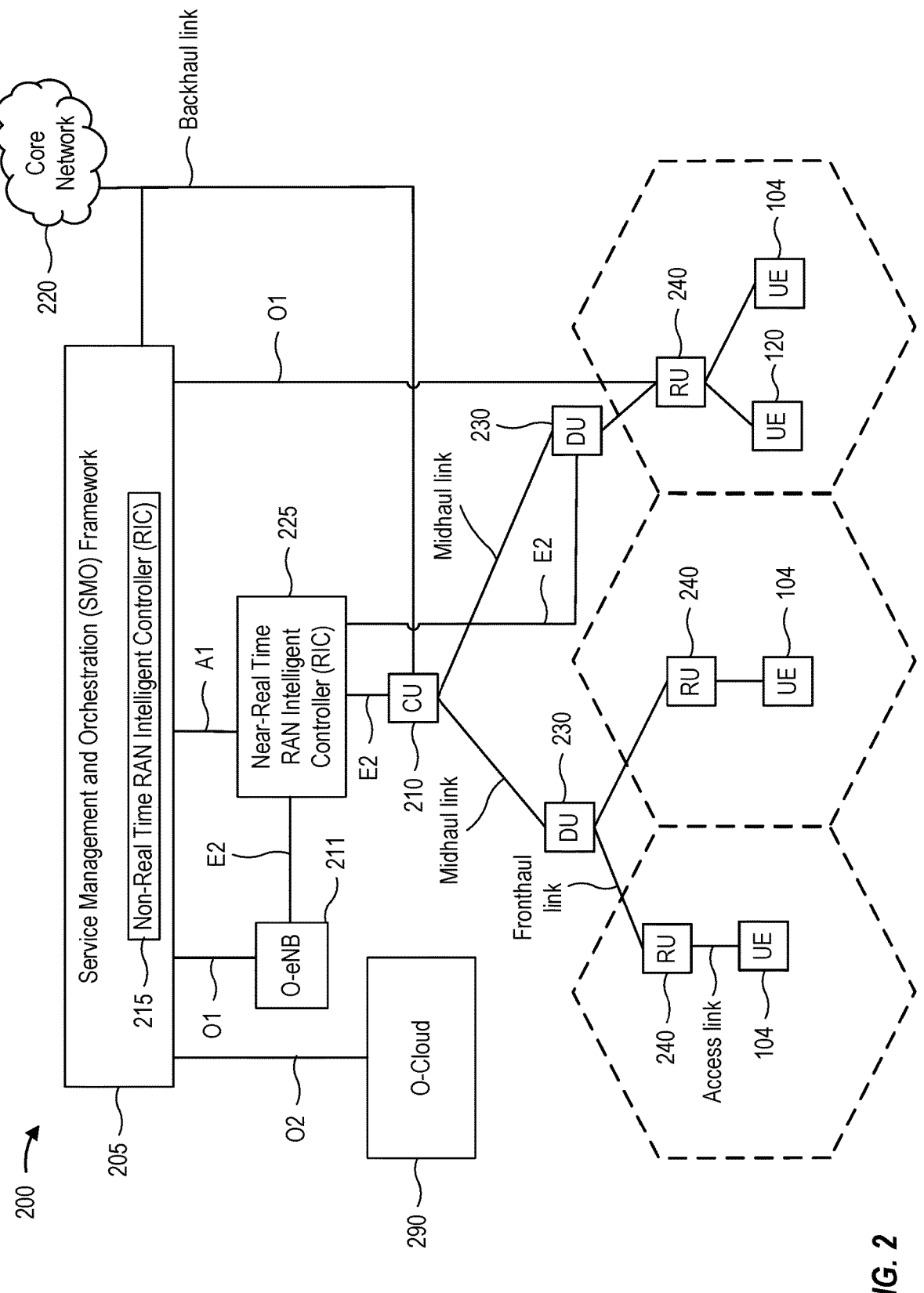
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52, 600 MHz and a second sub-range FR2-2 including 52,600 MHz-71,000 MHz. A base station configured to communicate using mm Wave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHZ and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
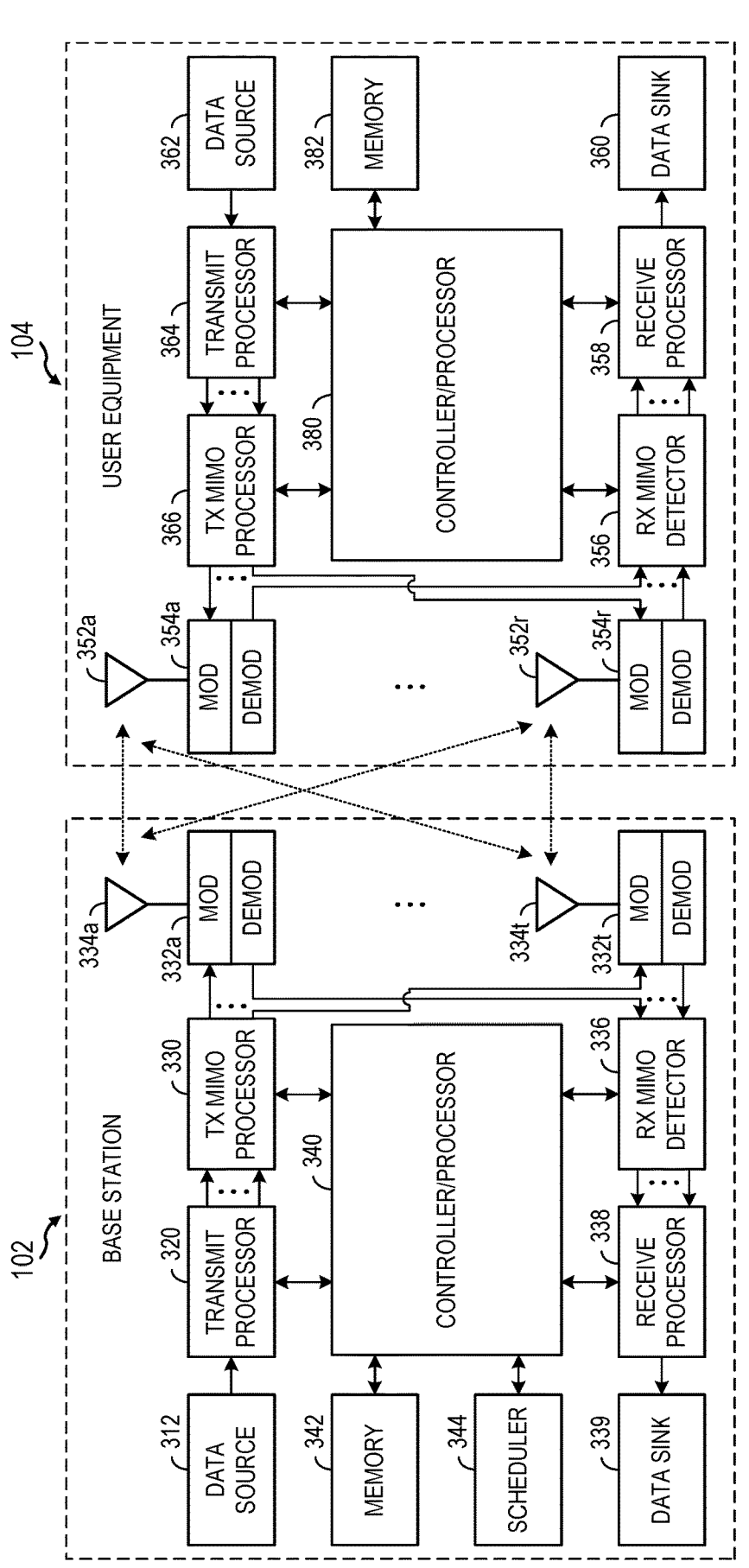
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
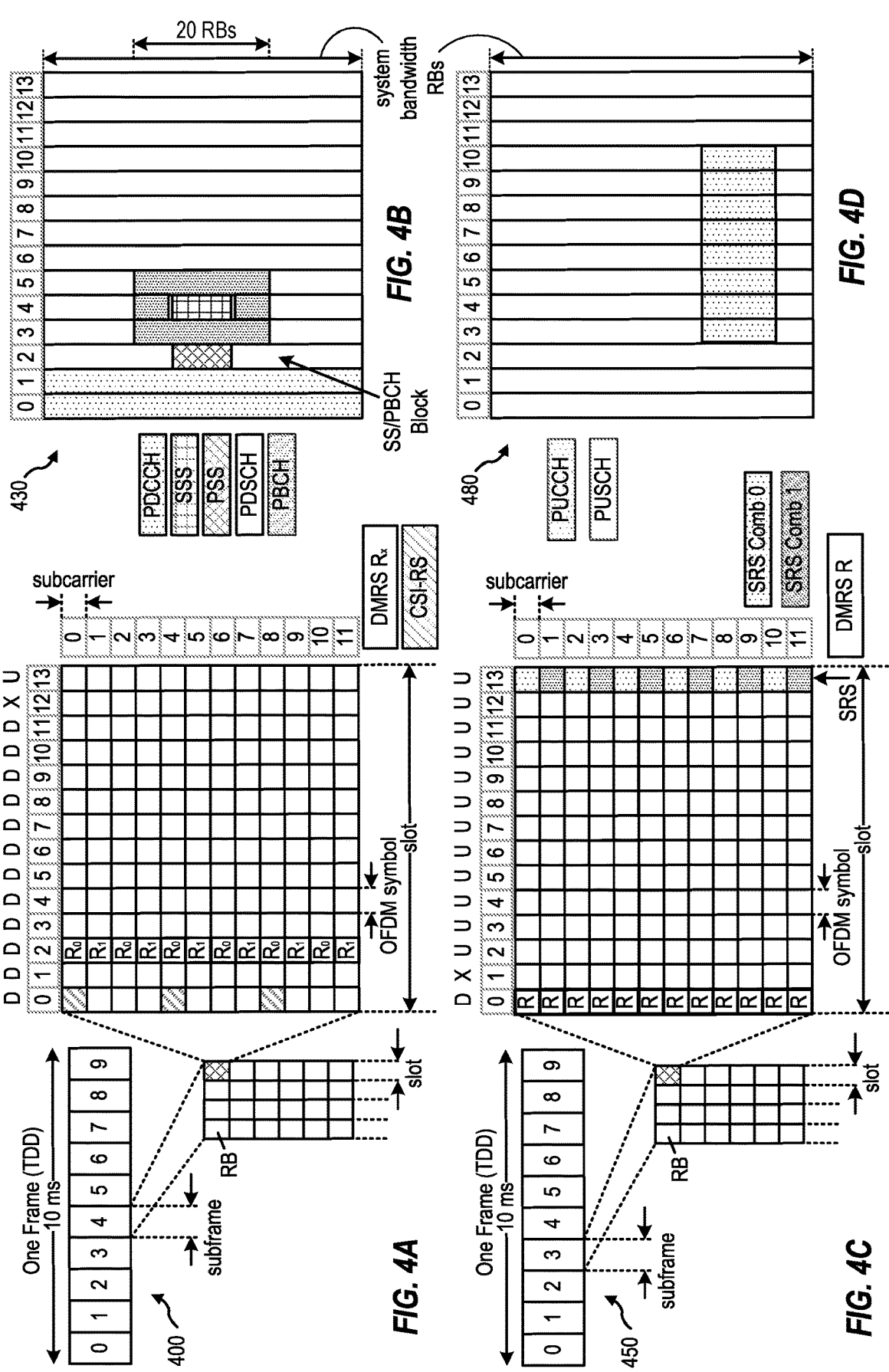
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram

450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to 24×15 kHz, where u is the numerology 0 to 6. As such, the numerology $\mu$=0 has a subcarrier spacing of 15 kHz and the numerology $\mu$=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to RACH Procedures

A random access channel (RACH) is so named because it refers to a wireless channel (medium) that may be shared by multiple UEs (e.g., such as UE 104 of FIGS. 1 and 3) and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 5:
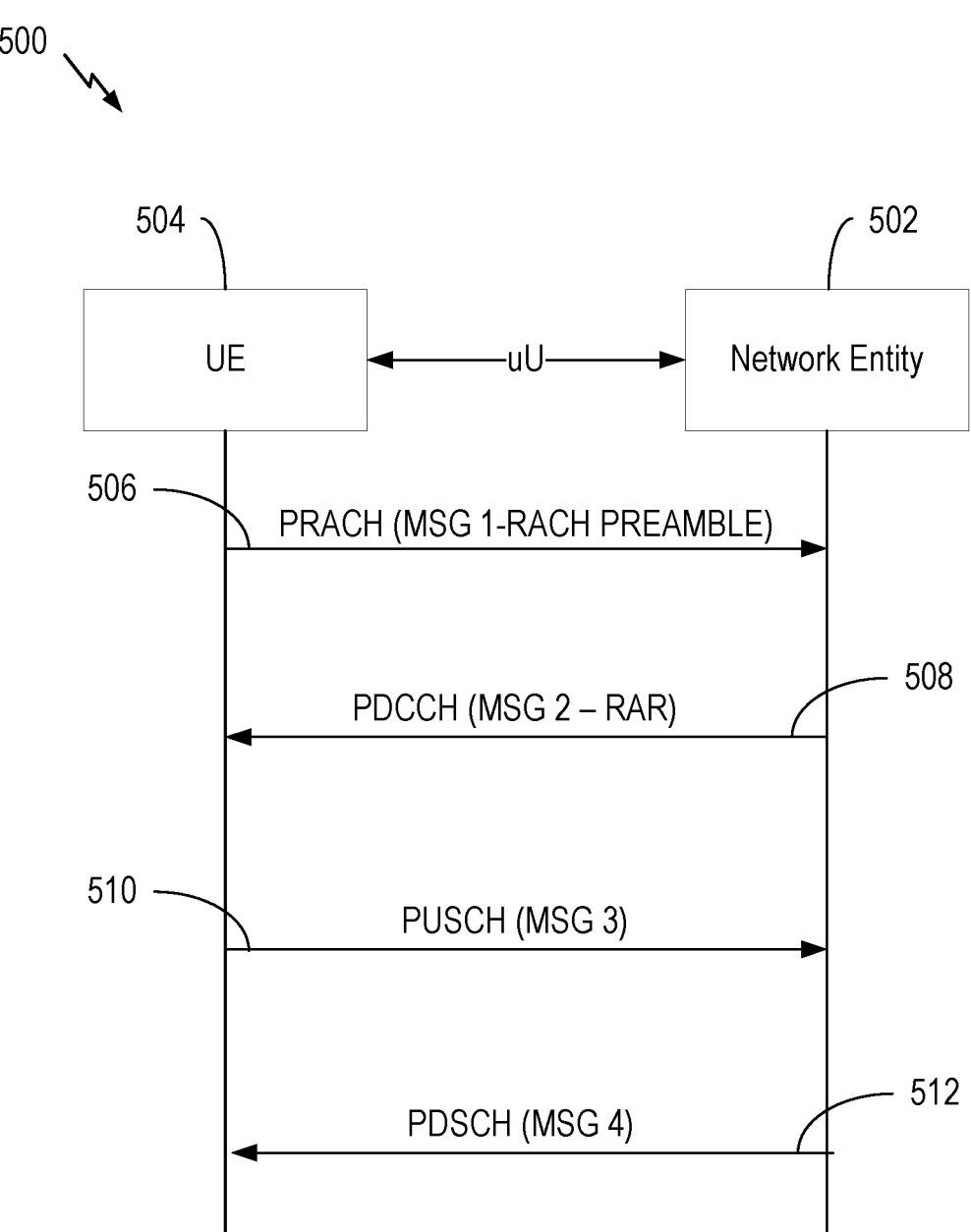
FIG. 5 depicts process flow diagram illustrating an example four-step random access channel procedure.

FIG. 5 is a process flow 500 (or a "timing" or "call-flow") diagram illustrating an example four-step RACH procedure, in accordance with certain aspects of the present disclosure. A first message (MSG1) may be sent from the UE 504 to network entity 502 (such as a BS 102 of FIGS. 1 and 3) on the physical random access channel (PRACH). In this case, MSG1 may include a RACH preamble selected from a plurality of configured RACH preambles. A RACH preamble may include a cyclic prefix (CP), a sequence (e.g., a Zadoff-Chu sequence), and a guard period.

Network entity 502 may respond with a second message (MSG2) of the RACH procedure. The second message may be a random access response (RAR) message that includes one or more of an identifier (ID) of the RACH preamble in MSG1, a timing advance (TA) command, an uplink grant, a temporary cell radio network temporary identifier (TC-RNTI), and a back off indicator. In some cases, the uplink grant may include time-frequency resources for the UE 504 to use to transmit a third message (MSG3) of the RACH procedure to the network entity 502.

For example, in response to receiving MSG2, the UE 504 may transmit MSG3 to network entity 502 on a PUSCH. The MSG3 may include one or more of a RRC connection request, a tracking area update (TAU) request, a system information request, a positioning fix or positioning signal request, UE-ID such as a C-RNTI, medium access control-control element (MAC CE), or a scheduling request.

The network entity 502 may then responds with a fourth message (MSG4) of the RACH procedure. The MSG4 may include at least one of a contention resolution message or downlink control information (DCI).

In some cases, to speed up access, a two-step RACH procedure may be supported. As the name implies, the two-step RACH procedure effectively condenses the four messages of the four-step RACH procedure into two messages: MSGA and MSGB.

Figure 6:
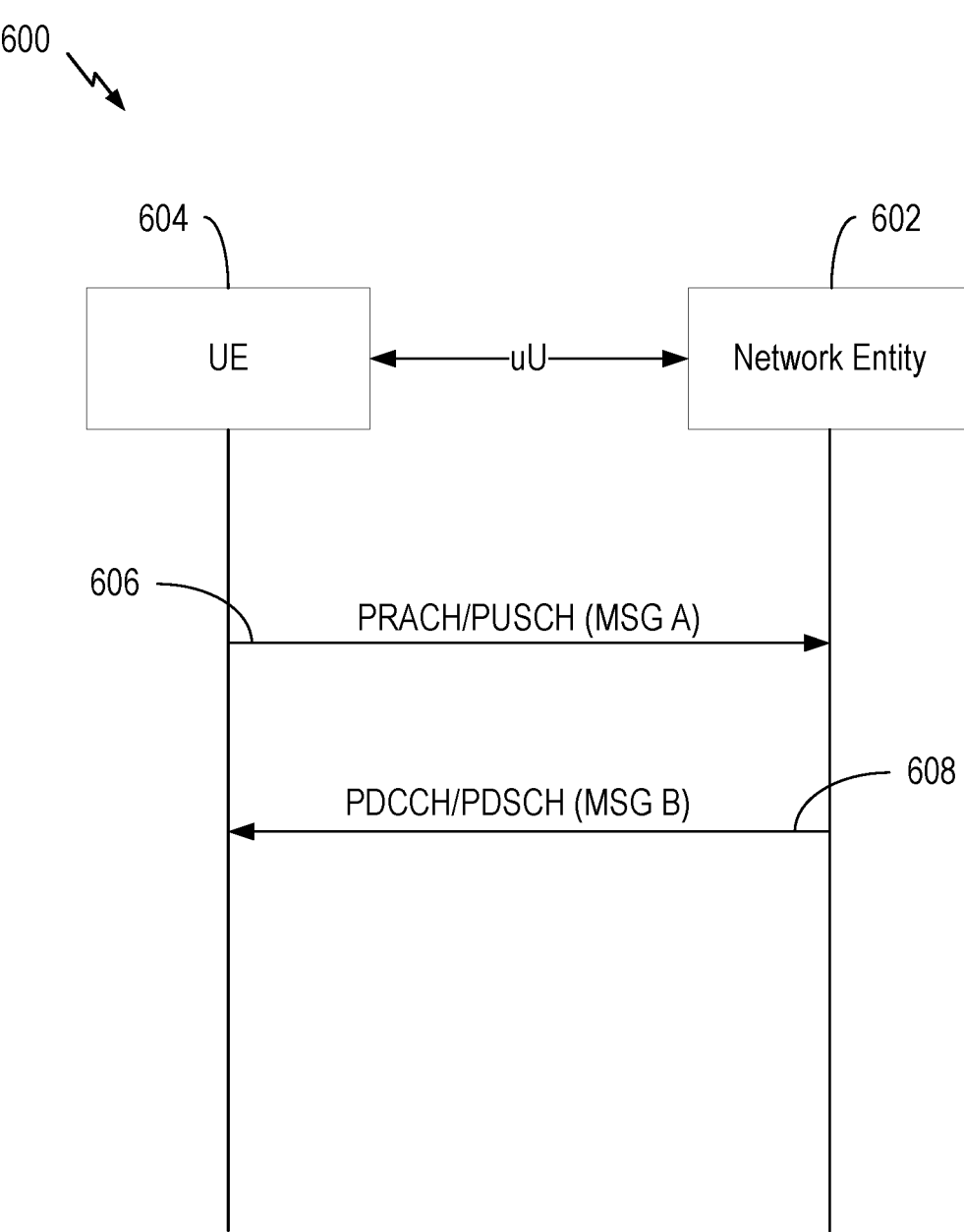
FIG. 6 depicts process flow diagram illustrating an example two-step random access channel procedure.

FIG. 6 is a process flow 600 illustrating an example two-step RACH procedure, in accordance with certain aspects of the present disclosure. A first enhanced message (MSGA) may be sent from the UE 604 to network entity 602. The MSGA includes some or all the information from the MSG1 and MSG3 from the four-step RACH procedure, effectively combining the MSG1 and MSG3. For example, MSGA may include MSG1 and MSG3 multiplexed together such as using one of time-division multiplexing or frequency-division multiplexing. MSGA may include a RACH preamble for random access and a payload. The MSGA payload, for example, may include the UE-ID, buffer status report (BSR), RRC connection request, TAU request, system information request, positioning fix or positioning signal request, and/or scheduling request.

Network entity 602 may respond with a RAR message (MSGB) which may effectively combine the MSG2 and MSG4 described above. For example, MSGB may include the ID of the RACH preamble, a TAC, a back off indicator, a contention resolution message, UL/DL grant, and transmit power control (TPC) commands.

Aspects Related to Default System Information Configuration for Different Network Types A UE may perform a RACH procedure in different scenarios, such as for initial access to a network when the UE switches from a radio resource control (RRC) connected idle mode to active mode or when handing over in RRC connected mode from a source network entity (e.g., source base station associated with a source cell) to a target network entity (e.g., a target base station associated with a target cell). As noted above, the RACH procedure begins with the UE transmitting a first message (MSG1), including at least a RACH preamble, to a network entity. This first message may also colloquially be known as a physical random access channel (PRACH) signal or transmission.

In some cases, due to various factors such as signal propagation, interference, and multi-path fading, PRACH signals transmitted by the UE may not always reach the network entity successfully, resulting in the network entity failing to detect the RACH preamble transmitted by the UE and delaying access of the UE to the network. To overcome these issues and improve the chances of successful detection, a technique known as PRACH repetition may be used. PRACH repetition involves the UE repeating transmission of a PRACH signal and RACH preamble multiple times within a short period. By doing so, the probability of successful detection by the network entity increases significantly. The network entity may then use advanced signal processing techniques to combine and decode the repeated PRACH signals, thereby enhancing the reliability of an initial access procedure.

In some cases, PRACH repetition may be defined by one or more parameters. These parameters may include, for example, a number of repetitions, RACH occasion group pattern (e.g., for PRACH repetition), a corresponding synchronization signal reference signal received power (SS-RSRP) threshold for each repetition number, frequency hopping parameters, etc. In some cases, the one or more parameters for PRACH repetition may be included within system information broadcast by the network entity, such as a first system information block (SIB1).

In addition to PRACH/MSG1 repetition, MSG3 repetition may be used, which may involve the UE repeating transmission MSG3 multiple times within a short period to increase the probability of successful detection of MSG3 at the network entity. Similar to PRACH repetition, MSG3 repetition may be defined by one or more parameters. The one or more parameters may include, for example, a number of repetitions for initial MSG3 transmission, a number of repetitions for MSG3 retransmission, one or more default modulation and coding scheme (MCS) values, etc. In some cases, the one or more parameters for MSG3 repetition may also be included within the system information (e.g., SIB1) broadcast by the network entity.

In some cases, when the one or more parameters for MSG3 repetition are not explicitly included or configured within SIB1, the one or more parameters for MSG3 repetition may be selected from a pre-configured set of default parameters. For example, the set of default parameters may include a set of repetition numbers (e.g., 1, 2, 3, 4) from which the number of repetitions for initial MSG3 transmission may be selected. Similarly, the set of default parameters may include a set of repetition numbers (e.g., 1, 2, 3, 4) from which the number of repetitions for MSG3 retransmission may be selected. Additionally, in some cases, the set of default parameters may include a set of MCS values for initial MSG3 transmission and/or retransmission.

Including the one or more parameters for PRACH/MSG1 repetition and the one or more parameters for MSG3 repetition within SIB1 may increase a payload size of SIB1, which is undesirable in some cases. For example, increasing the payload of SIB1 may result in an increase of a coding rate of SIB1, which may result in a decrease in coverage of SIB1 for certain types of networks, such as non-terrestrial networks (NTNs) and/or extra-long range terrestrial networks (TNs). As such, there is a need to support the configuration of the one or more parameters for PRACH/

MSG1 repetition and the one or more parameters for MSG3 repetition while minimizing the impact to the payload size of SIB1.

One manner of minimizing the impact to the payload size of SIB1 may be to not include an explicit indication of one or more parameters for MSG3 repetition in SIB1 and instead allowing the UE to select the one or more parameters for MSG3 repetition from the set of default parameters. However, while the set of default parameters for MSG3 repetition may be helpful in many cases, the set of default parameters for MSG3 repetition may not be adequate for certain types of networks, such as NTNs and extra-long rage TNs.

For example, since a transmission range between the UE and a network entity (e.g., base station) in a TN may be relatively small, the set of repetition numbers (e.g., 1, 2, 3, 4) currently supported within the set of default parameters may be adequate to ensure that the network entity in the TN properly receives a MSG3 transmitted by the UE. However, due to the relatively long transmission ranges between the UE and an extra-long-range TN network entity or an NTN network entity (as well as due to the high speed at which NTN network entities travel), if the UE were to transmit MSG3 with a number of repetitions selected from the set of repetition numbers (e.g., 1, 2, 3, 4) currently supported within the set of default parameters, the extra-long-range TN network entity or NTN entity would likely fail to properly receive MSG3 from the UE. Failure to properly receive MSG3 may cause the RACH procedure to fail and delay access of the UE to the extra-long-range TN or NTN. As can be seen, the set of default parameters for MSG3 repetition, which may be adequate for certain types of networks, such as (non-extra-long range) TNs, may lead to negative effects in other types of networks, such as extra-long-range TNs and NTNs.

Accordingly, aspects of the present disclosure provide techniques for supporting configuration of PRACH repetition and MSG3 repetition in different network types while reducing the impact that the PRACH repetition and MSG3 repetition configuration has on a SIB1 payload size. In some cases, for example, these techniques may involve using different sets of default parameters for the different network types. For example, in some aspects, the UE may obtain information indicating which set of default parameters, from two or more different sets of default parameters associated with different network types, to use for performing a RACH procedure. The UE may then perform the RACH procedure the RACH procedure with a network entity using the indicated set of default parameters.

As can be seen, the different sets of default parameters may allow the UE to be configured with a set of default parameters that supports the network type with which the UE is performing the RACH procedure, thereby avoiding the situations discussed above in which the UE transmits MSG3 (or PRACH) with an inadequate number of repetitions for a particular network type (e.g., NTN, extra-long-range TN, etc.) that would cause MSG3 (or PRACH) to not be properly received by the network entity associated with that network type. Additionally, in some cases, the different sets of default parameters for the different types of network types may be pre-configured or obtained from one or more memories of the UE rather than being included within SIB1, which may avoid a significant increase in the payload size of SIB1 associated with configuring PRACH repetition and/or MSG3 repetition that may otherwise lead to an increase in coding rate of SIB1 and issues in certain types of networks discussed above.

Example Operations of Entities in a Communications Network

Figure 7:
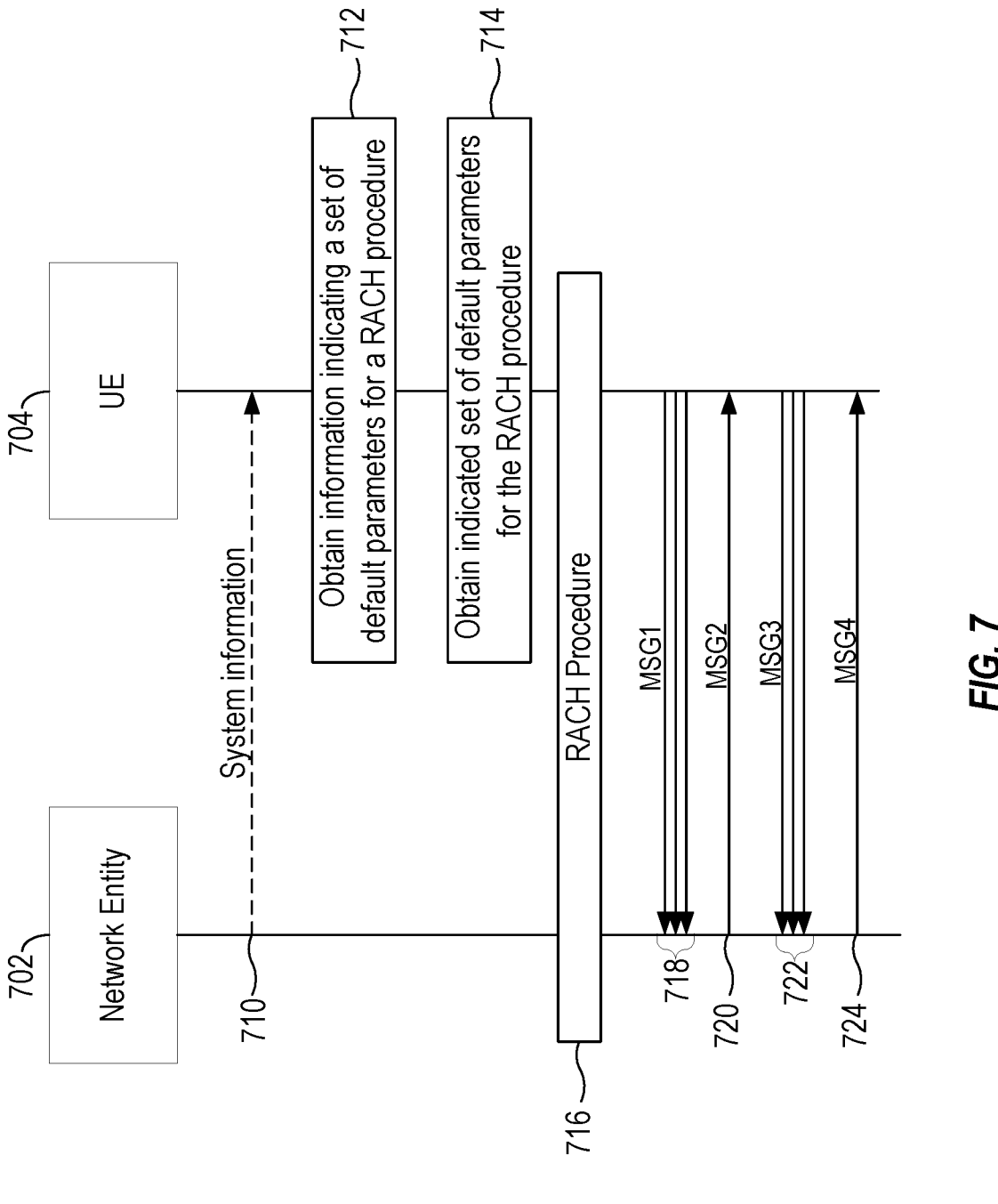
FIG. 7 depicts a process flow for communications in a network between a network entity and a user equipment.

FIG. 7 depicts a process flow including operations 700 for communications in a network between a network entity 702 and a user equipment (UE) 704. In some aspects, the operations 700 may be performed by the network entity 702 and UE 704 for configuring different sets of default parameters for different network types. In some aspects, the network entity 702 may be an example of the BS 102 depicted and described with respect to FIGS. 1 and 3 or a disaggregated base station depicted and described with respect to FIG. 2. Similarly, the UE 704 may be an example of UE 104 depicted and described with respect to FIGS. 1 and 3. However, in other aspects, UE 104 may be another type of wireless communications device and BS 102 may be another type of network entity or network node, such as those described herein.

As shown at step 710 in FIG. 7, the UE 704 may optionally receive system information from the network entity 702 that may be necessary for initial access. In some cases, the system information may include, for example, a master information block (MIB), SIB1, and/or other system information blocks.

As shown in step 720, the UE 704 obtains information indicating which set of default parameters, from two or more different sets of default parameters associated with different network types, to use for performing a random access channel (RACH) procedure. In some cases, the set of default parameters to use for performing the RACH procedure may depend on a network type associated with the network entity 702. For example, in some cases, the indicated set of default parameters may comprise a first set of default parameters for performing the RACH procedure associated with a first network type, which may be different from a second set of default parameters for performing the RACH procedure associated with a second network type.

In some cases, the first set of default parameters for performing the RACH procedure associated with the first network type may include a first set of numbers of repetitions for a first message (PRACH/MSG1) of the RACH procedure. For example, when the first type of network comprises an NTN, the first set of numbers of repetitions may include different numbers of repetitions to increase the likelihood that PRACH/MSG1 is properly received by the network entity 702. For example, for NTNs, the first set of numbers of repetitions may include (2, 4, 8, 18).

In some cases, the first set of default parameters for performing the RACH procedure associated with the first network type may include a second set of numbers of repetitions for a third message (MSG3) of the RACH procedure. For example, when the first type of network comprises an NTN, the second set of numbers of repetitions may include different numbers of repetitions to increase the likelihood that MSG3 is properly received by the network entity 702. For example, for NTNs, the first set of numbers of repetitions may include (4, 8, 16, 32).

In some cases, the first set of default parameters for performing the RACH procedure associated with the first network type may include an indication of a procedure for repetition of a first message (PRACH/MSG1) of the RACH procedure after one or more failed RACH attempts. For example, when performing the RACH procedure, the UE 704 may be configured to transmit the PRACH/MSG1 with a certain number of repetitions. The UE 704 may then monitor for a RAR message (MSG2) from the network entity 702 within a RAR window. In some cases, all repetitions of the PRACH/MSG1 before a start of the RAR window may be considered one RACH attempt. Accordingly, the indication of the procedure for repetition of the first message (PRACH/MSG1) of the RACH procedure after the one or more failed RACH attempts may indicate, for example, whether or not the UE 704 should attempt retransmission of the PRACH/MSG1 and how many times the UE 704 should attempt retransmission of the PRACH/MSG1 (e.g., each RACH attempt including a number of repetitions for the PRACH/MSG1). In some cases, a number of PRACH/MSG1 repetitions may be different for different RACH attempts.

In some cases, the first set of default parameters for performing the RACH procedure associated with the first network type may include one or more criteria for triggering repetitions for the first message of the RACH procedure. In some cases, the one or more criteria for triggering repetitions may be based on synchronization signal reference signal receive power (SS-RSRP). For example, in some cases, when SS-RSRP associated with a SSB received by the UE 704 is below a particular threshold, repetitions for the first message of the RACH procedure may be triggered.

In some cases, the first set of default parameters for performing the RACH procedure associated with the first network type may include one or more criteria for requesting repetitions for the third message of the RACH procedure. In some cases, the one or more criteria may include a threshold associated with SS-RSRP. For example, when the SS-RSRP associated with an SSB received by the UE 704 is less than the threshold, the UE 704 may be configured to request repetitions for the third message of the RACH procedure. In some cases, the first set of default parameters for performing the RACH procedure associated with the first network type may include an indication of a procedure for requesting the repetition of the third message of the RACH procedure. For example, in some cases, the indicated procedure may specify to request repetition for the third message of the RACH procedure using a subset of PRACH preambles or a subset of RACH occasions, or using repetition when transmitting the first message of the RACH procedure (e.g., PRACH/MSG1).

In some cases, the first network type may comprise a non-terrestrial network (NTN) while the second network type comprises a terrestrial network. In this case, the first set of default parameters may include default parameters for performing the RACH procedure for the NTN while the second set of default parameters may include default parameters for the TN. In other cases, first network type and second network type may be different types of NTNs. For example, in some cases, the first network type may comprise a geostationary (GEO) NTN while the second network type may comprise a low-earth orbit (LEO) NTN. In this case, the first set of default parameters may include default parameters for performing the RACH procedure for the GEO NTN while the second set of default parameters may include default parameters for the LEO NTN. In yet other cases, the first network type and second network type may comprise different types of TNs. For example, in some cases, the first network type may comprise an extra-long-range TN while the second network type comprises a non-extra-long-range TN. In some cases, an extra-long-range TN may comprise a fixed TN in which transmission ranges of approximately 10 kilometers or greater are supported while a non-extra-long-range TN may comprise a TN supporting transmission ranges below 10 kilometers. In this case, the first set of default parameters may include default parameters for performing the RACH procedure for the extra-long-range TN while the second set of default parameters may include default parameters for the non-extra-long-range TN.

As noted above, the set of default parameters to use for performing the RACH procedure may depend on the network type associated with the network entity 702. Accordingly, in some cases, the information indicating which set of default parameters, from the two or more different sets of default parameters associated with different network types, to use for performing a RACH procedure may comprise an indication of the network type associated with the network entity. For example, in some cases, the network entity 702 may provide the indication of the network type to the UE 704 and, based on the indication of the network type, the UE 704 may know to use the set of default parameters corresponding to the indicated network type. In some cases, the indication of the network type may be included in the system information received by the UE 704 in step 710.

In some cases, the information indicating which set of default parameters to use for performing a RACH procedure may comprise an SSB for which the RACH procedure is to be performed. For example, in some cases, as part of the system information received in step 710, the UE 704 may receive one or more SSBs from the network entity 702. In some cases, the network entity 702 may have a first set of transmission beams for transmitting SSBs for UEs that are located relatively close to the network entity 702 and a second set of transmission beams for transmitting SSBs for UEs that are located relatively far from the network entity 702. In such cases, the first set of transmission beams may be used to serve UEs of a first network type, such as a non-extra-long-range TN, while the second set of transmission beams may be used to serve UEs of a second network type, such as an extra-long-range TN. In some cases, each SSB received by the UE 704 from the network entity 702 may be associated with an SSB index, indicating the transmission beam to which that SSB corresponds. As such, in some cases, based on the SSB index of the SSB, the UE 704 may know whether that SSB is associated with the first set of transmission beams of the first network type or is associated with the second set of transmission beams of the second network type. Accordingly, depending on the SSB for which the RACH procedure is to be performed, the UE 704 may know the network type to which that SSB corresponds and which set of default parameters to use for performing the RACH procedure.

In some cases, the information indicating which set of default parameters to use for performing a RACH procedure may comprise a one-bit flag in the system information received by the UE 704 in step 710, such as SIB1 or MIB. For example, in some cases, a first value of the one-bit flag may indicate a first set of default parameters for a first network type to use for performing the RACH procedure. Similarly, a second value of the one-bit flag may indicate a second set of default parameters for a second network type to use for performing the RACH procedure. In some cases, if there are more than two different sets of default parameters, the system information may include a multi-bit flag or field that may be set to different values to indicate more than two different sets of default parameters.

In some cases, the information indicating which set of default parameters to use for performing a RACH procedure may comprise at least one of a frequency range associated with communication with the network entity 702 or a frequency band associated with communication with the network entity 702. For example, different sets of default parameters may, in some cases, be used for some frequency bands or frequency ranges and not used for other frequency bands or frequency ranges. For example, in some cases, different sets of default parameters may be used for a first frequency range (e.g., FR1) but may not be used for a second frequency range (e.g., FR2) or vice versa. Accordingly, based on the frequency range or frequency band, the UE 704 may know whether the different sets of default parameters (e.g., the two or more sets of default parameters) may be used and may determine which set of default parameters to use for the RACH procedure based, for example, on the frequency range or frequency band or other information described above, such as an SSB, network type, flag, etc.

In some cases, the information received by the UE 704 in step 712 may indicate how to interpret one or more bit fields in SIB1 or other downlink RACH messages (e.g., MSG2, MSG4, etc.). For example, in some cases, the information may indicate whether to interpret one or more bit fields in a first system information block (SIB1) or other downlink RACH message (e.g., MSG2, MSG4, etc.) as being associated with a first network type or being associated with a second network type. In some examples, the one or more bit fields may be associated with or used to indicate a number of repetitions for a third message of the RACH procedure (MSG3).

For example, in some cases, SIB1 and/or the other downlink RACH messages may include one or more bit fields that may include the set of default parameters for performing the RACH procedure. Accordingly, in some cases, the information received by the UE 704 in step 712 may indicate to the UE 704 that the one or more bit fields in SIB1 or the other downlink RACH messages correspond to a first network type. In this case, the UE 704 may interpret the one or more bit fields as being associated with the first network type and use the indicated set of default parameters for performing the RACH procedure for the first network type. In some cases, the information received by the UE 704 in step 712 may indicate to the UE 704 that the one or more bit fields in SIB1 or the other downlink RACH messages correspond to a second network type. In this case, the UE 704 may interpret the one or more bit fields as being associated with the second network type and use the indicated set of default parameters for performing the RACH procedure for the second network type In some cases, the one or more bit fields may, by default, be associated with the first network type, such as a non-extra-long-range TN. Accordingly, in some cases, the information received by the UE 704 in step 712 indicating how to interpret the one or more bit fields may effectively indicate to the UE 704 to "repurpose" the one or more bit fields for the second type of network, such as an extra-long-range TN, an NTN, etc. In such cases, SIB1 and/or the other downlink RACH messages may be used to carry additional sets of default parameters without needing to increase a payload size of SIB1 or the other downlink RACH messages as the UE 704 may be able to be instructed to interpret the existing bit fields and one or more parameters as being associated with different network types.

In some cases, the information indicating how to interpret the one or more bit fields (e.g., whether to interpret the one or more bit fields as being associated with the first network type or being associated with the second network type) may comprise information similar to that described above, such as the frequency range or frequency band or other information including an SSB, network type, flag, etc.

In some cases, as shown in step 714 of FIG. 7, the UE 704 may obtain the indicated set of default parameters based on the information indicating the set of default parameters received in step 712. In some cases, to reduce the payload size of the system information received in step 710, the system information received in step 710 may not include the indicated set of default parameters. In such cases, the UE 704 may not obtain the indicated set of default parameters from the system information and may obtain the indicate set of default parameters by other means. For example, in some cases, the indicated set of default parameters may pre-configured or obtained from one or more memories of the UE. For example, rather than transmitting the indicated set of default parameters in the system information in step 710, which would otherwise undesirably increase a payload size of the system information, the set of default parameters may instead be preconfigured in the UE 704. In such cases, the UE 704 may simply recall or load the indicated set of default parameters from one or more memories of the UE 704 (e.g., memory 382 described with respect to FIG. 3).

Thereafter, as shown in step 716 of FIG. 7, the UE 704 performs the RACH procedure with a network entity 702 using the indicated set of default parameters. In some cases, the RACH procedure may be performed in a similar manner to that described above with respect to FIG. 5. For example, as shown in step 718, the UE 704 may perform a first number of repetitions of a first RACH message (e.g., MSG1) of the RACH procedure based on the indicated set of default parameters. Thereafter, in step 720, the UE 704 may receive a second RACH message (e.g., MSG2) of the RACH procedure from the network entity 702. Thereafter, in step 722, the UE 704 may perform a second number of repetitions of a third RACH message (e.g., MSG3) of the RACH procedure based on the indicated set of default parameters. Thereafter, the UE 704 may receive a fourth RACH message (e.g., MSG4) of the RACH procedure from the network entity 702.

Example Operations of a User Equipment

FIG. 8 shows an example of a method 800 of wireless communication by a user equipment (UE), such as a UE 104 of FIGS. 1 and 3.

Method 800 begins at step 805 with obtaining information indicating which set of default parameters, from two or more different sets of default parameters associated with different network types, to use for performing a random access channel (RACH) procedure. In some cases, the operations of this step refer to, or may be performed by, circuitry for obtaining and/or code for obtaining as described with reference to FIG. 10.

Method 800 then proceeds to step 810 with performing the RACH procedure with a network entity using the indicated set of default parameters. In some cases, the operations of this step refer to, or may be performed by, circuitry for performing and/or code for performing as described with reference to FIG. 10.

In some aspects, the indicated set of default parameters comprises a first set of default parameters for performing the RACH procedure associated with a first network type, and wherein the first set of default parameters is different from a second set of default parameters for performing the RACH procedure associated with a second network type.

In some aspects, the first set of default parameters for performing the RACH procedure associated with the first network type includes at least one of: a first set of numbers of repetitions for a first message (MSG1) of the RACH procedure; a second set of numbers of repetitions for a third message (MSG3) of the RACH procedure; an indication of a procedure for repetition of a first message (MSG1) of the RACH procedure after one or more failed RACH attempts; a number of retransmissions for the first message (MSG1) of the RACH procedure after one or more failed RACH attempts; one or more criteria for triggering repetitions for the first message (MSG1) of the RACH procedure; one or more criteria for requesting repetitions for the third message (MSG3) of the RACH procedure; or an indication of a procedure for requesting repetition of the third message (MSG3) of the RACH procedure.

In some aspects, the first network type comprises a non-terrestrial network (NTN); and the second network type comprises a terrestrial network.

In some aspects, the first network type comprises a geostationary (GEO) non-terrestrial network (NTN); and the second network type comprises a low-earth orbit (LEO) NTN.

In some aspects, the first network type comprises an extra-long-range terrestrial network; and the second network type comprises a non-extra-long-range terrestrial network.

In some aspects, the information comprises an indication of a network type associated with the network entity.

In some aspects, the information comprises a synchronization signal block (SSB) for which the RACH procedure is to be performed.

In some aspects, the information comprises a one-bit flag in a first system information block (SIB1) or a master information block (MIB).

In some aspects, the information comprises at least one of a frequency range associated with communication with the network entity or a frequency band associated with communication with the network entity.

In some aspects, the information further indicates whether to interpret one or more bit fields in a first system information block (SIB1) as being associated with a first network type or being associated with a second network type.

In some aspects, the method 800 further includes obtaining the indicated set of default parameters based on the information. In some cases, the operations of this step refer to, or may be performed by, circuitry for obtaining and/or code for obtaining as described with reference to FIG. 10.

In some aspects, the indicated set of default parameters are pre-configured or obtained from one or more memories of the UE.

In some aspects, the indicated set of default parameters are not obtained from system information received from the network entity.

In some aspects, performing the RACH procedure comprises at least one of: performing a first number of repetitions of a first RACH message of the RACH procedure based on the indicated set of default parameters; or performing a second number of repetitions of a third RACH message of the RACH procedure based on the indicated set of default parameters.

Figure 10:
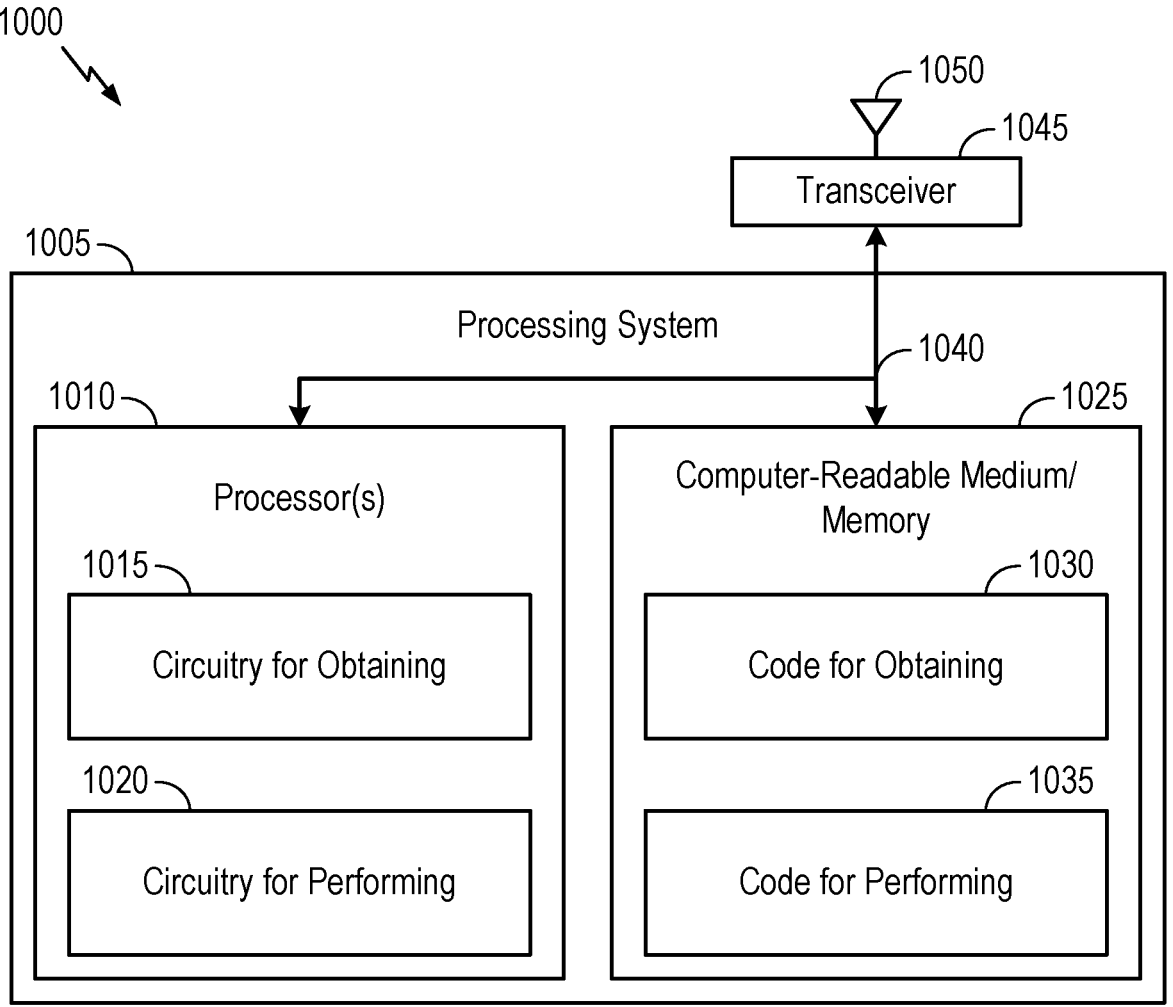
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Operations of a Network Entity

FIG. 9 shows an example of a method 900 of wireless communication by a network entity, such as a BS 102 of FIGS. 1 and 3, or a disaggregated base station as discussed with respect to FIG. 2.

Method 900 begins at step 905 with providing information indicating which set of default parameters, from two or more different sets of default parameters associated with different network types, for a user equipment (UE) to use for performing a random access channel (RACH) procedure. In some cases, the operations of this step refer to, or may be performed by, circuitry for providing and/or code for providing as described with reference to FIG. 11.

Method 900 then proceeds to step 910 with performing the RACH procedure with the UE based on the indicated set of default parameters. In some cases, the operations of this step refer to, or may be performed by, circuitry for performing and/or code for performing as described with reference to FIG. 11.

In some aspects, the indicated set of default parameters comprises a first set of default parameters for performing the RACH procedure associated with a first network type, and wherein the first set of default parameters is different from a second set of default parameters for performing the RACH procedure associated with a second network type.

In some aspects, the first set of default parameters for performing the RACH procedure associated with the first network type includes at least one of: a first set of numbers of repetitions for a first message (MSG1) of the RACH procedure; a second set of numbers of repetitions for a third message (MSG3) of the RACH procedure; an indication of a procedure for repetition of a first message (MSG1) of the RACH procedure after one or more failed RACH attempts; a number of retransmissions for the first message (MSG1) of the RACH procedure after one or more failed RACH attempts; one or more criteria for triggering repetitions for the first message (MSG1) of the RACH procedure; one or more criteria for requesting repetitions for the third message (MSG3) of the RACH procedure; or an indication of a procedure for requesting repetition of the third message (MSG3) of the RACH procedure.

In some aspects, the first network type comprises a non-terrestrial network (NTN); and the second network type comprises a terrestrial network.

In some aspects, the first network type comprises a geostationary (GEO) non-terrestrial network (NTN); and the second network type comprises a low-earth orbit (LEO) NTN.

In some aspects, the first network type comprises an extra-long-range terrestrial network; and the second network type comprises a non-extra-long-range terrestrial network.

In some aspects, the information comprises an indication of a network type associated with the network entity.

In some aspects, the information comprises a synchronization signal block (SSB) for which the RACH procedure is to be performed.

In some aspects, the information comprises a one-bit flag in a first system information block (SIB1) or a master information block (MIB).

In some aspects, the information comprises at least one of a frequency range associated with communication with the network entity or a frequency band associated with communication with the network entity.

In some aspects, the information further indicates whether to interpret one or more bit fields in a first system information block (SIB1) as being associated with a first network type or being associated with a second network type.

In some aspects, the indicated set of default parameters are pre-configured.

In some aspects, the indicated set of default parameters are not provided in system information transmitted by the network entity.

In some aspects, performing the RACH procedure comprises at least one of: receiving a first number of repetitions of a first RACH message of the RACH procedure based on the indicated set of default parameters; or receiving a second number of repetitions of a third RACH message of the RACH procedure based on the indicated set of default parameters. In some cases, the operations of this step refer to, or may be performed by, circuitry for receiving and/or code for receiving as described with reference to FIG. 11.

Figure 11:
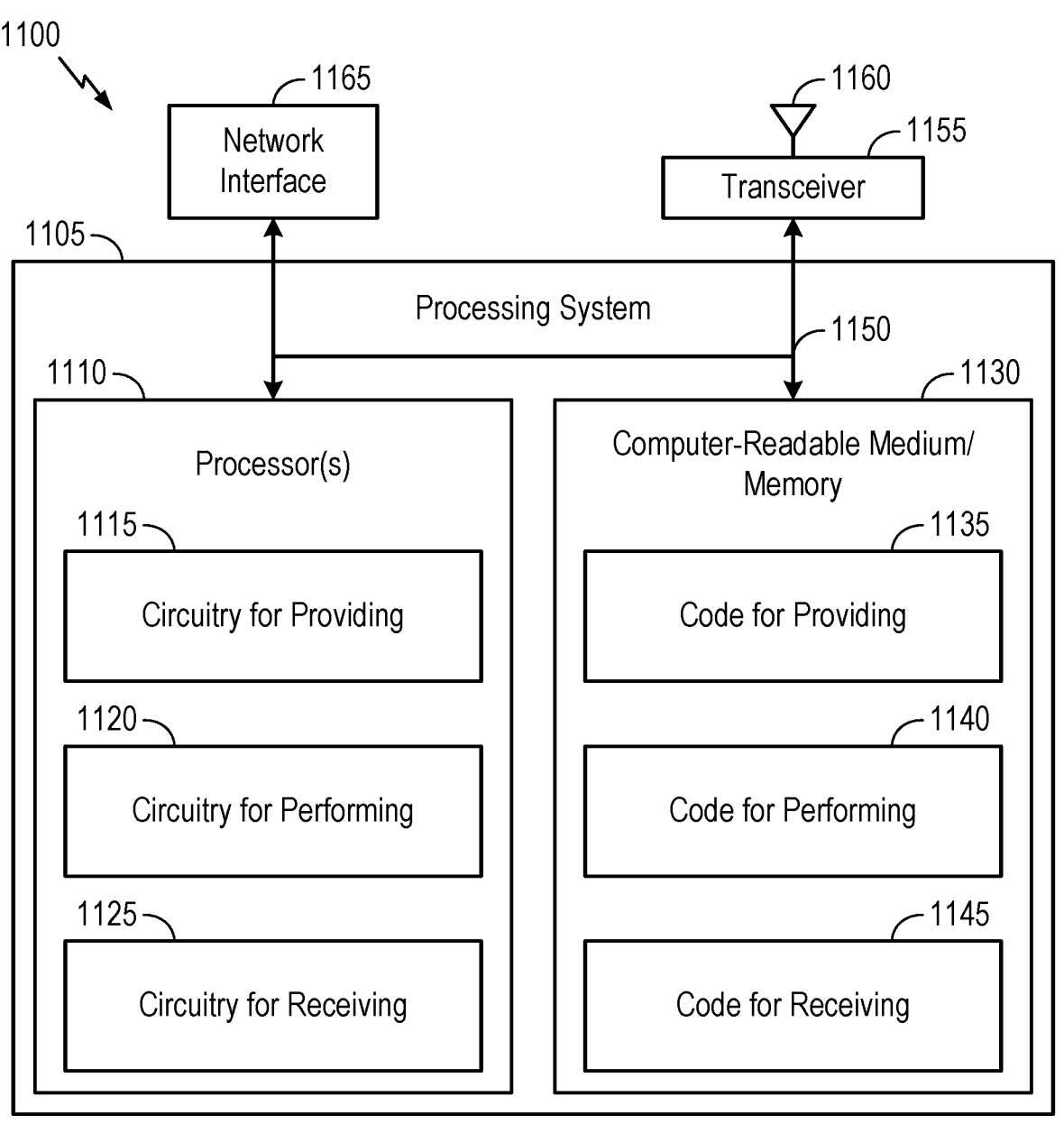
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Communications Device(s)

FIG. 10 depicts aspects of an example communications device 1000. In some aspects, communications device 1000 is a user equipment, such as UE 104 described above with respect to FIGS. 1 and 3.

The communications device 1000 includes a processing system 1005 coupled to the transceiver 1045 (e.g., a transmitter and/or a receiver). The transceiver 1045 is configured to transmit and receive signals for the communications device 1000 via the antenna 1050, such as the various signals as described herein. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of receive processor 358, transmit processor 364, TX MIMO processor 366, and/or controller/processor 380, as described with respect to FIG. 3. The one or more processors 1010 are coupled to a computer-readable medium/memory 1025 via a bus 1040. In certain aspects, the computer-readable medium/memory 1025 is configured to store instructions (e.g., computer-executable code) that when executed by the one or more processors 1010, cause the one or more processors 1010 to perform the method 800 described with respect to FIG. 8, or any aspect related to it. Note that reference to a processor performing a function of communications device 1000 may include one or more processors 1010 performing that function of communications device 1000.

In the depicted example, computer-readable medium/memory 1025 stores code (e.g., executable instructions), such as code for obtaining 1030 and code for performing 1035. Processing of the code for obtaining 1030 and code for performing 1035 may cause the communications device 1000 to perform the method 800 described with respect to FIG. 8, or any aspect related to it.

The one or more processors 1010 include circuitry configured to implement (e.g., execute) the code stored in the computer-readable medium/memory 1025, including circuitry such as circuitry for obtaining 1015 and circuitry for performing 1020. Processing with circuitry for obtaining 1015 and circuitry for performing 1020 may cause the communications device 1000 to perform the method 800 described with respect to FIG. 8, or any aspect related to it.

Various components of the communications device 1000 may provide means for performing the method 800 described with respect to FIG. 8, or any aspect related to it. For example, means for transmitting, sending or outputting for transmission may include transceivers 354 and/or antenna(s) 352 of the UE 104 illustrated in FIG. 3 and/or the transceiver 1045 and the antenna 1050 of the communications device 1000 in FIG. 10. Means for receiving or obtaining may include transceivers 354 and/or antenna(s) 352 of the UE 104 illustrated in FIG. 3 and/or the transceiver 1045 and the antenna 1050 of the communications device 1000 in FIG. 10.

FIG. 11 depicts aspects of an example communications device 1100. In some aspects, communications device 1100 is a network entity, such as BS 102 of FIGS. 1 and 3, or a disaggregated base station as discussed with respect to FIG. 2.

The communications device 1100 includes a processing system 1105 coupled to the transceiver 1155 (e.g., a transmitter and/or a receiver) and/or a network interface 1165. The transceiver 1155 is configured to transmit and receive signals for the communications device 1100 via the antenna 1160, such as the various signals as described herein. The network interface 1165 is configured to obtain and send signals for the communications device 1100 via communication link(s), such as a backhaul link, midhaul link, and/or fronthaul link as described herein, such as with respect to FIG. 2. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1130 via a bus 1150. In certain aspects, the computer-readable medium/memory 1130 is configured to store instructions (e.g., computer-executable code) that when executed by the one or more processors 1110, cause the one or more processors 1110 to perform the method 900 described with respect to FIG. 9, or any aspect related to it. Note that reference to a processor of communications device 1100 performing a function may include one or more processors 1110 of communications device 1100 performing that function.

In the depicted example, the computer-readable medium/memory 1130 stores code (e.g., executable instructions), such as code for providing 1135, code for performing 1140, and code for receiving 1145. Processing of the code for providing 1135, code for performing 1140, and code for receiving 1145 may cause the communications device 1100 to perform the method 900 described with respect to FIG. 9, or any aspect related to it.

The one or more processors 1110 include circuitry configured to implement (e.g., execute) the code stored in the computer-readable medium/memory 1130, including circuitry such as circuitry for providing 1115, circuitry for performing 1120, and circuitry for receiving 1125. Processing with circuitry for providing 1115, circuitry for performing 1120, and circuitry for receiving 1125 may cause the communications device 1100 to perform the method 900 described with respect to FIG. 9, or any aspect related to it.

Various components of the communications device 1100 may provide means for performing the method 900 described with respect to FIG. 9, or any aspect related to it. Means for transmitting, sending or outputting for transmission may include transceivers 332 and/or antenna(s) 334 of the BS 102 illustrated in FIG. 3 and/or the transceiver 1155 and the antenna 1160 of the communications device 1100 in FIG. 11. Means for receiving or obtaining may include transceivers 332 and/or antenna(s) 334 of the BS 102 illustrated in FIG. 3 and/or the transceiver 1155 and the antenna 1160 of the communications device 1100 in FIG. 11.

EXAMPLE CLAUSES

Implementation examples are described in the following numbered clauses:

Clause 1: A method for wireless communication by a user equipment (UE), comprising: obtaining information indicating which set of default parameters, from two or more different sets of default parameters associated with different network types, to use for performing a random access channel (RACH) procedure; and performing the RACH procedure with a network entity using the indicated set of default parameters.

Clause 2: The method of Clause 1, wherein the indicated set of default parameters comprises a first set of default parameters for performing the RACH procedure associated with a first network type, and wherein the first set of default parameters is different from a second set of default parameters for performing the RACH procedure associated with a second network type.

Clause 3: The method of Clause 2, wherein the first set of default parameters for performing the RACH procedure associated with the first network type includes at least one of: a first set of numbers of repetitions for a first message (MSG1) of the RACH procedure; a second set of numbers of repetitions for a third message (MSG3) of the RACH procedure; an indication of a procedure for repetition of a first message (MSG1) of the RACH procedure after one or more failed RACH attempts; a number of retransmissions for the first message (MSG1) of the RACH procedure after one or more failed RACH attempts; one or more criteria for triggering repetitions for the first message (MSG1) of the RACH procedure; one or more criteria for requesting repetitions for the third message (MSG3) of the RACH procedure; or an indication of a procedure for requesting repetition of the third message (MSG3) of the RACH procedure.

Clause 4: The method of Clause 2, wherein: the first network type comprises a non-terrestrial network (NTN); and the second network type comprises a terrestrial network.

Clause 5: The method of Clause 2, wherein: the first network type comprises a geostationary (GEO) non-terrestrial network (NTN); and the second network type comprises a low-earth orbit (LEO) NTN.

Clause 6: The method of Clause 2, wherein: the first network type comprises an extra-long-range terrestrial network; and the second network type comprises a non-extra-long-range terrestrial network.

Clause 7: The method of any one of Clauses 1-6, wherein the information comprises an indication of a network type associated with the network entity.

Clause 8: The method of any one of Clauses 1-7, wherein the information comprises a synchronization signal block (SSB) for which the RACH procedure is to be performed.

Clause 9: The method of any one of Clauses 1-8, wherein the information comprises a one-bit flag in a first system information block (SIB1) or a master information block (MIB).

Clause 10: The method of any one of Clauses 1-9, wherein the information comprises at least one of a frequency range associated with communication with the network entity or a frequency band associated with communication with the network entity.

Clause 11: The method of any one of Clauses 1-10, wherein the information further indicates whether to interpret one or more bit fields in a first system information block (SIB1) as being associated with a first network type or being associated with a second network type.

Clause 12: The method of any one of Clauses 1-11, further comprising obtaining the indicated set of default parameters based on the information.

Clause 13: The method of Clause 12, wherein the indicated set of default parameters are pre-configured or obtained from one or more memories of the UE.

Clause 14: The method of Clause 12, wherein the indicated set of default parameters are not obtained from system information received from the network entity.

Clause 15: The method of any one of Clauses 1-14, wherein performing the RACH procedure comprises at least one of: performing a first number of repetitions of a first RACH message of the RACH procedure based on the indicated set of default parameters; or performing a second number of repetitions of a third RACH message of the RACH procedure based on the indicated set of default parameters.

Clause 16: A method for wireless communication by a network entity, comprising: providing information indicating which set of default parameters, from two or more different sets of default parameters associated with different network types, for a user equipment (UE) to use for performing a random access channel (RACH) procedure; and performing the RACH procedure with the UE based on the indicated set of default parameters.

Clause 17: The method of Clause 16, wherein the indicated set of default parameters comprises a first set of default parameters for performing the RACH procedure associated with a first network type, and wherein the first set of default parameters is different from a second set of default parameters for performing the RACH procedure associated with a second network type.

Clause 18: The method of Clause 17, wherein the first set of default parameters for performing the RACH procedure associated with the first network type includes at least one of: a first set of numbers of repetitions for a first message (MSG1) of the RACH procedure; a second set of numbers of repetitions for a third message (MSG3) of the RACH procedure; an indication of a procedure for repetition of a first message (MSG1) of the RACH procedure after one or more failed RACH attempts; a number of retransmissions for the first message (MSG1) of the RACH procedure after one or more failed RACH attempts; one or more criteria for triggering repetitions for the first message (MSG1) of the RACH procedure; one or more criteria for requesting repetitions for the third message (MSG3) of the RACH procedure; or an indication of a procedure for requesting repetition of the third message (MSG3) of the RACH procedure.

Clause 19: The method of Clause 17, wherein: the first network type comprises a non-terrestrial network (NTN); and the second network type comprises a terrestrial network.

Clause 20: The method of Clause 17, wherein: the first network type comprises a geostationary (GEO) non-terrestrial network (NTN); and the second network type comprises a low-earth orbit (LEO) NTN.

Clause 21: The method of Clause 17, wherein: the first network type comprises an extra-long-range terrestrial network; and the second network type comprises a non-extra-long-range terrestrial network.

Clause 22: The method of any one of Clauses 16-21, wherein the information comprises an indication of a network type associated with the network entity.

Clause 23: The method of any one of Clauses 16-22, wherein the information comprises a synchronization signal block (SSB) for which the RACH procedure is to be performed.

Clause 24: The method of any one of Clauses 16-23, wherein the information comprises a one-bit flag in a first system information block (SIB1) or a master information block (MIB).

Clause 25: The method of any one of Clauses 16-24, wherein the information comprises at least one of a frequency range associated with communication with the network entity or a frequency band associated with communication with the network entity.

Clause 26: The method of any one of Clauses 16-25, wherein the information further indicates whether to interpret one or more bit fields in a first system information block (SIB1) as being associated with a first network type or being associated with a second network type.

Clause 27: The method of any one of Clauses 16-26, wherein the indicated set of default parameters are pre-configured.

Clause 28: The method of any one of Clauses 16-27, wherein the indicated set of default parameters are not provided in system information transmitted by the network entity.

Clause 29: The method of any one of Clauses 16-28, wherein performing the RACH procedure comprises at least one of: receiving a first number of repetitions of a first RACH message of the RACH procedure based on the indicated set of default parameters; or receiving a second number of repetitions of a third RACH message of the RACH procedure based on the indicated set of default parameters.

Clause 30: An apparatus, comprising: one or more memories comprising executable instructions; and one or more processors configured to execute the executable instructions and cause the apparatus to perform a method in accordance with any one of Clauses 1-29.

Clause 31: An apparatus, comprising means for performing a method in accordance with any one of Clauses 1-29.

Clause 32: A non-transitory computer-readable medium comprising executable instructions that, when executed by one or more processors of an apparatus, cause the apparatus to perform a method in accordance with any one of Clauses 1-29.

Clause 33: A computer program product embodied on a computer-readable storage medium comprising code for performing a method in accordance with any one of Clauses 1-29.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
obtaining information indicating which set of default parameters, from two or more different sets of default parameters associated with different network types, to use for performing a random access channel (RACH) procedure;
obtaining the indicated set of default parameters based on the information, wherein the indicated set of default parameters are obtained from one or more memories of the UE and not from system information received from a network entity; and
performing the RACH procedure with the network entity using the indicated set of default parameters for supporting configuration of PRACH repetition or MSG3 repetition in the different network types.

2. The method of claim 1, wherein the indicated set of default parameters comprises a first set of default parameters for performing the RACH procedure associated with a first network type, and wherein the first set of default parameters is different from a second set of default parameters for performing the RACH procedure associated with a second network type.

3. The method of claim 2, wherein the first set of default parameters for performing the RACH procedure associated with the first network type includes at least one of:
a first set of numbers of repetitions for a first message (MSG1) of the RACH procedure;
an indication of a procedure for repetition of the MSG1 of the RACH procedure after one or more failed RACH attempts;
a number of retransmissions for the MSG1 of the RACH procedure after one or more failed RACH attempts; or
one or more criteria for triggering repetitions for the MSG1 of the RACH procedure.

4. The method of claim 2, wherein:
the first network type comprises a non-terrestrial network (NTN); and
the second network type comprises a terrestrial network.

5. The method of claim 2, wherein:
the first network type comprises a geostationary (GEO) non-terrestrial network (NTN); and
the second network type comprises a low-earth orbit (LEO) NTN.

6. The method of claim 2, wherein:
the first network type comprises an extra-long-range terrestrial network; and
the second network type comprises a non-extra-long-range terrestrial network.

7. The method of claim 2, wherein the first set of default parameters for performing the RACH procedure associated with the first network type further includes at least one of:
a second set of numbers of repetitions for a third message (MSG3) of the RACH procedure;
one or more criteria for requesting repetitions for the MSG3 of the RACH procedure; or
an indication of a procedure for requesting repetition of the MSG3 of the RACH procedure.

8. The method of claim 1, wherein the information comprises an indication of a network type associated with the network entity.

9. The method of claim 1, wherein the information comprises a synchronization signal block (SSB) for which the RACH procedure is to be performed.

10. The method of claim 9, wherein when synchronization signal reference signal receive power (SS-RSRP) associated with the SSB is below a particular threshold, repetitions for a MSG1) are triggered.

11. The method of claim 1, wherein the information comprises a one-bit flag in a first system information block (SIB1) or a master information block (MIB).

12. The method of claim 1, wherein the information comprises at least one of a frequency range associated with communication with the network entity or a frequency band associated with communication with the network entity.

13. The method of claim 1, wherein the information further indicates whether to interpret one or more bit fields in a first system information block (SIB1) as being associated with a first network type or being associated with a second network type.

14. The method of claim 1, wherein the indicated set of default parameters are pre-configured.

15. The method of claim 1, wherein performing the RACH procedure comprises at least one of:
performing a first number of repetitions of a MSG1) based on the indicated set of default parameters; or
performing a second number of repetitions of a third message (MSG3) based on the indicated set of default parameters.

16. A method for wireless communication by a network entity, comprising:
providing information indicating which set of default parameters, from two or more different sets of default parameters associated with different network types, for a user equipment (UE) to use for performing a random access channel (RACH) procedure, wherein the indicated set of default parameters are not provided in system information transmitted by the network entity; and
performing the RACH procedure with the UE based on the indicated set of default parameters for supporting configuration of PRACH repetition or MSG3 repetition in the different network types.

17. The method of claim 16, wherein the indicated set of default parameters comprises a first set of default parameters for performing the RACH procedure associated with a first network type, and wherein the first set of default parameters is different from a second set of default parameters for performing the RACH procedure associated with a second network type.

18. The method of claim 17, wherein the first set of default parameters for performing the RACH procedure associated with the first network type includes at least one of:

a first set of numbers of repetitions for a MSG1) of the RACH procedure;

an indication of a procedure for repetition of the MSG1 of the RACH procedure after one or more failed RACH attempts;

a number of retransmissions for the MSG1 of the RACH procedure after one or more failed RACH attempts; or one or more criteria for triggering repetitions for the MSG1 of the RACH procedure.

19. The method of claim 17, wherein:

the first network type comprises a non-terrestrial network (NTN); and the second network type comprises a terrestrial network.

20. The method of claim 17, wherein:

the first network type comprises a geostationary (GEO) non-terrestrial network (NTN); and the second network type comprises a low-earth orbit (LEO) NTN.

21. The method of claim 17, wherein:

the first network type comprises an extra-long-range terrestrial network; and the second network type comprises a non-extra-long-range terrestrial network.

22. The method of claim 16, wherein the information comprises an indication of a network type associated with the network entity.

23. The method of claim 16, wherein the information comprises a synchronization signal block (SSB) for which the RACH procedure is to be performed.

24. The method of claim 16, wherein the information comprises a one-bit flag in a first system information block (SIB1) or a master information block (MIB).

25. The method of claim 16, wherein the information comprises at least one of a frequency range associated with communication with the network entity or a frequency band associated with communication with the network entity.

26. The method of claim 16, wherein the information further indicates whether to interpret one or more bit fields in a first system information block (SIB1) as being associated with a first network type or being associated with a second network type.

27. The method of claim 16, wherein the indicated set of default parameters are pre-configured.

28. The method of claim 16, wherein performing the RACH procedure comprises at least one of:

receiving a first number of repetitions of a MSG1) based on the indicated set of default parameters; or receiving a second number of repetitions of a third message (MSG3) based on the indicated set of default parameters.

29. An apparatus for wireless communication by a user equipment (UE), comprising a processing system that includes:

one or more memories comprising executable instructions; and one or more processors coupled with the one or more memories configured to execute the executable instructions, the processing system configured to cause the apparatus to:

obtain information indicating which set of default parameters, from two or more different sets of default parameters associated with different network types, to use for performing a random access channel (RACH) procedure;

obtain the indicated set of default parameters based on the information, wherein the indicated set of default parameters are obtained from the one or more memories of the UE and not from system information received from a network entity; and perform the RACH procedure with the network entity using the indicated set of default parameters for supporting configuration of PRACH repetition or MSG3 repetition in the different network types.

30. An apparatus for wireless communication by a network entity, comprising a processing system that includes:

one or more memories comprising executable instructions; and one or more processors coupled with the one or more memories configured to execute the executable instructions, the processing system configured to cause the apparatus to:

provide information indicating which set of default parameters, from two or more different sets of default parameters associated with different network types, for a user equipment (UE) to use for performing a random access channel (RACH) procedure, wherein the indicated set of default parameters are not provided in system information transmitted by the network entity; and perform the RACH procedure with the UE based on the indicated set of default parameters for supporting configuration of PRACH repetition or MSG3 repetition in the different network types.

* * * * *